(12) United States Patent
Claussen et al.

(10) Patent No.: US 7,373,855 B2
(45) Date of Patent: May 20, 2008

(54) SWITCHING DEVICE FOR A PARKING BRAKE

(75) Inventors: Heiko Claussen, Hannover (DE); Jürgen Eickhoff, Walsrode (DE); Helmut Kortschakowski, Garbsen (DE); Klaus Pape, Hannover (DE)

(73) Assignee: WABCO GmbH & Co. OHG, Hannover (DE)

( * ) Notice: Subject to any disclaimer, the term of this patent is extended or adjusted under 35 U.S.C. 154(b) by 576 days.

(21) Appl. No.: 10/766,518

(22) Filed: Jan. 27, 2004

(65) Prior Publication Data

US 2004/0226808 A1 Nov. 18, 2004

(30) Foreign Application Priority Data

Feb. 1, 2003 (DE) ............................. 103 04 007

(51) Int. Cl.
*G05G 1/04* (2006.01)
(52) U.S. Cl. ........................................... 74/523
(58) Field of Classification Search ................. 74/523, 74/524, 525, 543, 544, 545, 546, 547; 188/1.11 E, 188/3 R, 72.9, 156; 303/15, 20
See application file for complete search history.

(56) References Cited

U.S. PATENT DOCUMENTS

| | | | | |
|---|---|---|---|---|
| 6,213,259 | B1 * | 4/2001 | Hanson et al. | 188/156 |
| 6,382,741 | B1 * | 5/2002 | McCann et al. | 303/191 |
| 6,648,107 | B2 * | 11/2003 | Lundholm et al. | 188/156 |
| 6,702,405 | B1 * | 3/2004 | Balz et al. | 303/192 |
| 7,121,633 | B2 * | 10/2006 | Tachiiri et al. | 303/20 |

* cited by examiner

*Primary Examiner*—Vicky A. Johnson
(74) *Attorney, Agent, or Firm*—Kramer Levin Naftalis & Frankel LLP

(57) ABSTRACT

The invention relates to a switching device for a parking brake, especially a commercial-vehicle parking brake, with a handle that can be moved between a pulled position for engaging the parking brake and a pushed position for releasing the parking brake, and to such a parking brake. The handle is subjected to a preload force toward a central position when it is in the pulled or pushed position. Depending on the position of the handle, an evaluation device outputs different control signals for an actuating device of the parking brake.

14 Claims, 1 Drawing Sheet

SWITCHING DEVICE FOR A PARKING BRAKE

BACKGROUND OF THE INVENTION

The present invention relates to a switching device for a parking brake and to a parking brake equipped with such a switching device, especially for commercial vehicles.

Parking brakes are known in particular as spring brake actuators of SAAR- or SAHR-type (that is, "Spring Actuated Air Released" or "Spring Actuated Hydraulic Released" respectively) and are used to actuate a brake-application device.

In Europe parking brakes for commercial vehicles are generally engaged by pulling and released by pushing a handle implemented as a lever—usually a linearly adjustable lever—disposed in the driver's cab.

In the United States, the parking-brake function or locking function is generally achieved by pulling a handle with a button into a pulled position; subsequently the parking brake can be disengaged by pushing the button inward and the handle downward.

Typically, the button to be actuated by the driver adjusts a parking-brake valve. In general, the parking-brake valve is designed such that, if the supply pressure drops below an internal set value, the button automatically springs outward and the rear axle is braked. In emergencies, the parking-brake valve can be pulled manually at any time, in order to activate the parking brake. As an additional option, a parking-brake safety valve can be provided, in order to reduce the pressure due to spring loading. Thus, release of the parking brake can be prevented until all systems have enabled release of the parking brake.

In such a switching device, whether it is actuated by lever or by button, the pressure conduits are routed into the driver's cab and complex valves are provided. In order to ensure that the handle springs out automatically, a complex design is necessitated.

Accordingly, it is desired to provide an improved parking brake and switching device constructed and arranged to ensure, with relatively little complexity, both automatic and manual movement capability of the parking brake, while at the same time retaining the features of conventional systems, i.e., the brake function in the pulled position and the brake release function in the pushed position of the actuating lever or button.

SUMMARY OF THE INVENTION

Generally speaking, in accordance with the present invention, a switching device for a parking brake and a parking brake equipped with such a switching device are provided which avoid disadvantages associated with prior art devices.

In one embodiment of the present invention, a central switch position is provided between a pulled and a pushed switch position of a handle. From either the pulled or pushed switch position the handle is returned by preload force to the central switch position, which is free of forces. Depending on the various positions of the handle, there are output different control signals, whereupon an actuating device engages or releases the brake device in response to these control signals. According to the present invention, the pressure conduits and the complex valves in the driver's cab are therefore rendered unnecessary by the fact that the handle no longer directly actuates a valve in the brake system of the brake, but merely generates a control signal. Control of the actuating device can take place directly in the region of the parking brake, in which case only appropriate control signals need be transmitted for this purpose.

According to the present invention, the complex function necessary in the prior art to make the handle-button spring out is rendered unnecessary by providing the handle with a central switch position which is free of forces, and into which the handle is returned in each case by the preload force. Since the handle returns to the central switch position after each actuation, the command to engage or release the parking brake can be transmitted at any time.

Advantageously, the positions of the handle are evaluated by an electrical evaluation device, for example by switches that can be adjusted by the handle. For this purpose, there can be provided, for example, a potentiometer circuit, in which each switch shunts out a resistor or leaves it in circuit during movement from the central position to the pulled or pushed switch position respectively. Thus, an analog control signal can be output, which is delivered directly or via an evaluation device to the actuating device for the parking brake.

The control signal can be used simultaneously for monitoring and if necessary indicating the position of the switch. Furthermore, inadvertent operation of the parking brake during driving can be prevented, and, for example, a command input by the driver to apply the brake during driving can be evaluated as a signal to actuate the service brake.

Accordingly, a switching device is provided that eliminates the necessity for pressure conduits and complex valves in the driver's cab for the control of the parking brake.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

For purposes of this application and given the different arrangements of parking brake handles used, the term "handle" shall refer generically to parking brake handles, including, for example, parking brake handles constructed as a lever, as a lever with a release button, or as a button, as well as other forms of parking brake handles.

Figure 1:
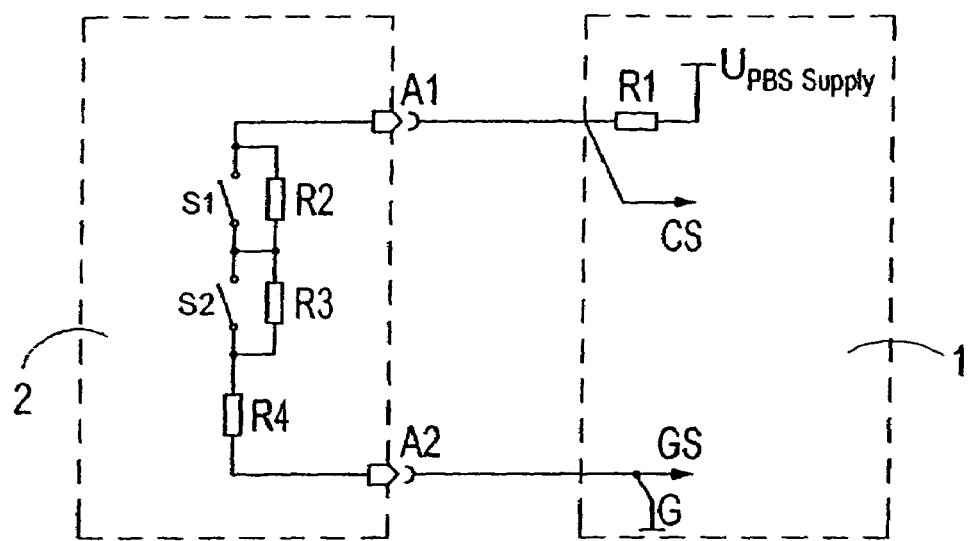
FIG. 1 is a circuit diagram of an evaluation device constructed in accordance with a preferred embodiment of the present invention.

Referring now to FIG. 1, an evaluation device or detection device (hereinafter "evaluation device") 1 is provided between an operating-voltage terminal $U_{PBS\ supply}$ and a ground terminal G with a first resistor R1 and a switching device 2. Switching device 2 is connected to terminals A1 and A2 between first resistor R1 and ground terminal G, and is provided with a second resistor R2, a third resistor R3 and a fourth resistor R4, which are connected in series with first resistor R1. Second resistor R2 is shunted out by a first switch S1 in its closed position; correspondingly, third resistor R3 is shunted out by a second switch S2 in its closed position. A control signal CS is tapped between first resistor R1 and second resistor R2 at a terminal A1; accordingly, control signal CS has a voltage value of CS=$U_{PBS\ supply}$·(R2+R3+R4)/(R1+R2+R3+R4) when switches S1, S2 are in the illustrated open position. When switches S1 and S2 are closed, the control signal has the value of CS=$U_{PBS\ supply}$·R4/(R1+R4). When second switch S2 is closed and switch 1 is open, a voltage value of CS=$U_{PBS\ supply}$·(R2+R4)/(R1+R2+R4) is output as the control signal.

Both control signal CS at terminal A1 and signal GS at the ground connection G, or in other words at terminal A2 of switching device 2, are received by evaluation device 1.

Figure 2:
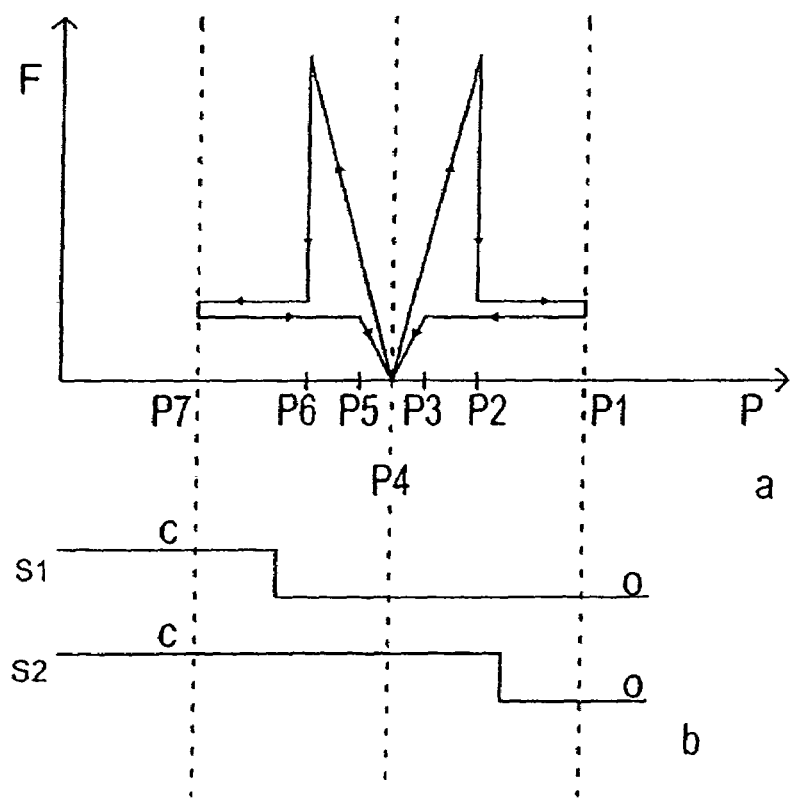
FIGS. 2a and 2b are graphs representing actuating characteristics of the switching device according to the present invention in different switch positions.

Referring now to FIG. 2a, actuating force F is shown as a function of the shifted position P of a handle of the switching device. Switch positions C (closed) and O (open) of switches S1 and S2 are compared in FIG. 2b.

The handle can be moved in linear direction from a pulled first fixed switch position P1 via a second and a third position P2 and P3, to a central fourth fixed switch position P4, into a pushed seventh fixed switch position P7 via a fifth and sixth position P5 and P6. The handle may also be moved back in reverse manner. Positions P2, P3, P5 and P6, provided in addition to the three fixed switch positions P1, P4 and P7, represent temporary overshoot positions. Fourth position P4 forms a central position of the handle, which is free of forces.

Starting from central switch position P4, movement to pushed switch position P7 or to pulled switch position P1 and back takes place along the curves indicated respectively by arrows (FIG. 2a). These curves have mirror symmetry relative to the central switch position P4, and so a symmetric force pattern is developed when the handle is pushed or pulled. As indicated in FIG. 2a, when the handle is pulled from central switch position P4 into second position P2, it is opposed at first by a strong constant spring action, or in other words by a linearly increasing spring force. Thus, an internal movement range with hard spring characteristic or hard snap behavior is developed between positions P2 and P6, and, during actuation of the handle, the driver experiences a mechanical resistance, which is also applied during the movement of mechanical switches.

When the second or sixth position P2 or P6 respectively has been reached, the spring force drops abruptly to a lower value. The driver can then move the handle in an outer movement range from second or sixth position P2 or P6, respectively, against the constant force into end switch position P1 or P7 respectively.

As indicated in FIG. 2b, in central switch position P4, first switch S1 is open and second switch S2 is closed. When the handle is moved from second position P2 into pulled first switch position P1, second switch S2 is additionally opened. During movement from sixth position P6 to pushed seventh switch position P7, first switch S1 is closed. Thus, both switches S1, S2 are open in pulled switch position P1; correspondingly, both switches S1, S2 are closed in pushed switch position P7.

When the actuating handle is returned from switch positions P1, P7 to central switch position P4, the driver can simply release the handle. The return movement in the outer return ranges takes place at first with a constant, relatively small restoring force, which still corresponds, for example, to the restoring force of the outer movement range. When third position P3 or fifth position P5 is reached, the restoring force in an inner return range decreases linearly to central switch position P4. Compared with the restoring force for movement out of fourth switch position P4, however, this restoring force between position P3 and switch position P4 as well as between position P5 and switch position P4 has a softer spring characteristic. Thus, snapping into central switch position P4 takes place in a manner that is perceptible to the driver.

In switch positions P1, P4 and P7, analog control signals CS1, CS4 and CS7 with distinctly different voltage levels are applied at port A1. For an operating voltage of $U_{PBS\ supply}$ and resistors of equal value R1=R2=R3=R4, the voltage values delivered are therefore CS1=¾·$U_{PBS\ supply}$, CS4=⅔·$U_{PBS\ supply}$ and CS7=½·$U_{PBS\ supply}$.

Control signals CS and CS1, CS4 and CS7 respectively are received by evaluation device 1 and converted to a suitable control signal for the actuating device of a brake-application device, or are fed directly to the actuating device.

Accordingly, the present invention provides a switching device that eliminates the necessity for pressure conduits and complex valves in the driver's cab for the control of the parking brake.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A switching device for a vehicle parking brake, comprising a handle movable between a first position for engaging the parking brake and a second position for disengaging the parking brake, said handle also movable to a third position between said first and second positions substantially free of forces urging said handle into either of said first and second positions, and an evaluation device, said handle being subjected to a preload force toward said third position when said handle is in either of said first and second positions, said evaluation device adapted to output different control signals to an actuating device of the parking brake based on the position of said handle.

2. The switching device of claim 1, wherein said handle is movable linearly between said first, second and third positions.

3. The switching device of claim 1, wherein said handle is movable within a defined first inner movement range extending from said third position to a first limit point, a first outer movement range extending from said first limit point to said first position, a second inner movement range extending from said third position to a second limit point, and a second outer movement range extending from said second limit point to said second position, said handle movable in said first inner movement range against a first increasing spring force and in said second inner movement range against a second increasing spring force, said first increasing spring force decreasing at said first limit point and said second increasing spring force decreasing at said second limit point.

4. The switching device of claim 3, wherein said first increasing spring force and said second increasing spring force increase linearly with displacement from said central position.

5. The switching device of claim 3, wherein said handle is movable in said first and said second outer movement ranges against a substantially constant spring force.

6. The switching device of claim 3, wherein said handle is returned from said first position to said third position by a substantially constant spring force in a first outer return movement range and a decreasing spring force in a first inner return movement range, and said handle is returned from said second position to said third position by a substantially constant spring force in a second outer return movement range and a decreasing spring force in a second inner return movement range.

7. The switching device of claim 3, wherein said decreasing spring forces acting upon said handle in said first and said second inner return movement ranges decrease linearly as said handle returns to said central position.

8. The switching device of claim 1, wherein said evaluation device includes a first switch and a second switch that can be switched by said handle.

9. The switching device of claim 8, wherein said evaluation device includes a potentiometric device adjustable by said handle.

10. The switching device of claim 8, wherein said first switch is switched during movement of said handle between said third position and said second position, and said second switch is switched during movement of said handle between said third position and said first position.

11. The switching device of claim 10, wherein said handle is moveable within a first outer movement range extending from a first limit point to said first position and a second outer movement range extending from a second limit point to said second position, said handle is returned from said first position to said third position in a first outer return movement range and said handle is returned from said second position to said third position in a second outer return movement range, said first switch is switched during movement of said handle in said second outer movement range and said second outer return movement range, and said second switch is switched during movement of said handle in said first outer movement range and in said first outer return movement range.

12. The switching device of claim 10, further comprising a first and a second resistor, wherein said first and second switches are electrically connected in series, said first switch shunting out said first resistor and said second switch shunting out said second resistor.

13. The switching device of claim 12, further comprising a third resistor, wherein a voltage signal is applied between said third resistor and said first switch and said second switch, said voltage signal being output as a control signal.

14. A vehicle parking brake system, comprising a brake-application device, an actuating device for actuation of said brake-application device, and a switching device, said switching device having an evaluation device and a handle moveable between a first position and a second position, said handle also movable to a third position between said first and second positions, said third position being substantially free of forces urging said handle into either of said first and second positions, said handle being subjected to a preload force toward said third position when said handle is in either of said first and said second positions, said evaluation device adapted to output different control signals to said actuating device based on the position of said handle, said actuating device engaging said brake application device during movement of said handle into said first position and said actuating device releasing said brake application device during movement of said handle into said second position.

\* \* \* \* \*